United States Patent
Schliep et al.

(10) Patent No.: US 7,260,022 B2
(45) Date of Patent: Aug. 21, 2007

(54) METHOD AND APPARATUS FOR DETECTING, EVALUATING AND IDENTIFYING A STATIONARY OR MOVING OBJECT

(75) Inventors: Michael Schliep, Aichtal (DE); Szabolcs Toergyekes, Stuttgart (DE); Walter Zipp, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 351 days.

(21) Appl. No.: 10/485,147

(22) PCT Filed: Jun. 28, 2002

(86) PCT No.: PCT/EP02/07142

§ 371 (c)(1),
(2), (4) Date: Sep. 15, 2004

(87) PCT Pub. No.: WO03/012475

PCT Pub. Date: Feb. 13, 2003

(65) Prior Publication Data

US 2005/0041529 A1 Feb. 24, 2005

(30) Foreign Application Priority Data

Jul. 30, 2001 (DE) ................ 101 36 981

(51) Int. Cl.
*G01S 3/80* (2006.01)
(52) U.S. Cl. .................................... 367/124
(58) Field of Classification Search ............. 367/89, 367/99, 127, 125, 124, 151
See application file for complete search history.

(56) References Cited

U.S. PATENT DOCUMENTS

| 4,528,563 A | 7/1985 | Takeuchi |
| 4,806,931 A | 2/1989 | Nelson |
| 5,319,611 A | 6/1994 | Korba |
| 5,339,075 A | 8/1994 | Abst et al. |
| 5,481,505 A | 1/1996 | Donald et al. |
| 5,619,616 A | 4/1997 | Brady et al. |
| 2005/0041529 A1* | 2/2005 | Schliep et al. ............... 367/99 |

FOREIGN PATENT DOCUMENTS

| DE | 42 20 429 A1 | 6/1992 |
| DE | 44 32 532 A1 | 9/1994 |
| DE | 199 22 411 A1 | 5/1999 |
| JP | 03-068883 A | 3/1991 |
| JP | 06-227339 A | 8/1994 |

(Continued)

OTHER PUBLICATIONS

Notification of Reason for Refusal dated Mar. 31, 2006 including an English Translation (Four (4) pages).

*Primary Examiner*—Dan Pihulic
(74) *Attorney, Agent, or Firm*—Crowell & Moring LLP (57) ABSTRACT

A method and apparatus for the determination of a stationary and/or moving object, such as a vehicle, acoustic signals emitted by the object and/or reflected by another object are recorded and used to evaluate or identify an object. The object is detected, evaluated and identified acoustically with the aid of noises from it and/or extraneous noises, with respect to its own movement profile in relation to one or more coordinate axes (x, y axes), in the manner of a self-localization based on sound waves.

22 Claims, 9 Drawing Sheets

FOREIGN PATENT DOCUMENTS

| | | |
|---|---|---|
| JP | 2000-098015 A | 4/2000 |
| JP | 2000-099863 A | 4/2000 |
| JP | 2000-105274 A | 4/2000 |
| JP | 2000-111633 A | 4/2000 |
| JP | 2000-123267 A | 4/2000 |
| JP | 2000-182198 A | 6/2000 |

* cited by examiner

METHOD AND APPARATUS FOR DETECTING, EVALUATING AND IDENTIFYING A STATIONARY OR MOVING OBJECT

BACKGROUND AND SUMMARY OF THE INVENTION

This application claims the priority of German patent document 101 36 981.6, filed 30 Jul. 2001 (PCT International Application No. PCT/EP02/07142, filed 28 Jun. 2002), the disclosure of which is expressly incorporated by reference herein.

The invention relates to a method and apparatus for detecting, evaluating and identifying a stationary or moving object, such as a vehicle.

In order to record movement profiles or states of an object, for example a vehicle, associated operational signals of the vehicle, such as on/off signals from the starter and actual speed of the tachometer, are conventionally recorded and monitored. A disadvantage of this technique is that only vehicle-related signals are recorded and monitored. Other systems are known for taking the environment of the vehicle into account, for example a millimeter-wave radar for identifying road conditions ahead from DE 199 32 094 A1, and a CW radar system (CW=continuous wave) for measuring distances and relative speeds between a vehicle and one or more obstacles from DE 199 22 411 A1. These do not make it possible for signals which are caused by the vehicle itself, and which affect the environment, to be taken into account and evaluated. Furthermore, a radar system is particularly demanding and cost-intensive in terms of installation and maintenance, and requires precise and very time- and cost-intensive adjustment.

U.S. Pat. No. 5,619,616 discloses a system for classifying automobiles based on their sound emission.

U.S. Pat. No. 5,319,611 describes an autonomous vehicle that detects obstacles in the area via sound waves reflected by the obstacles.

One object of the invention is to provide a method and apparatus for the detecting, evaluating and identifying a stationary or moving object, which is improved and simplified compared with the prior art.

This and other objects and advantages are achieved by the method and apparatus according to the invention, in which acoustic signals emitted by the object or reflected by another object or by a plurality of objects are recorded as a reference signal. Based on these signals, a relevant object, such as a vehicle that is either stationary or moving, can be detected, evaluated and/or identified acoustically with the aid of noises received from it and/or extraneous noises, including an evaluation of its own movement profile in relation to one or more coordinate axes (x, y axes), in the manner of self-localization based on sound waves. Both structure-borne and air-borne sound signals are expediently recorded as the acoustic signals.

For particularly fast, reliable and realistic analysis and evaluation of the relevant object, the acoustic signals are processed in real time and/or transmitted to other systems, such as a control and/or regulating system. In this way, it is possible to form a very early conclusion about the relevant object (in particular, its movement state and/or movement profile), so that it is in turn possible to determine information which may be necessary and/or to make decisions which are transmitted to relevant communication systems and/or control and/or regulating systems.

Advantageously, the noise signals representing the relevant or particular object are filtered out of the recorded acoustic signals. Depending on the type of object and the situation, on the one hand the filtered-out (and therefore object-related) noise signals may be processed and used for analyses. On the other hand, non-object-related acoustic signals may be processed, analyzed and evaluated from the difference between recorded acoustic signals and object-related noise signals. In this way, besides self-localization, it is also possible to detect interference affecting the object, and/or another stationary and/or moving object.

Preferably, a movement state or profile pertaining to the relevant object is calculated and/or forecast based on the recorded acoustic signals. For example, acoustic signals reflected by a guardrail of a road lane, in particular reflected noise signals from the actual vehicle, are used to determine the distance from the reflecting surface (i.e., the distance from the guardrail). In this way, taking other parameters into account, it is possible to detect, analyze and evaluate the fact that the object (i.e., the vehicle), is approaching another object (the guardrail). For example, when the lateral distance from the guardrail falls below a limit, it is possible to conclude that a driver of the vehicle is falling asleep and to deliver a corresponding warning message.

More preferably, the movement profile of the object may be calculated with respect to one or more coordinate axes. In addition or alternatively, the calculation of the movement profile may be refined using a noise analysis. For example, the object is monitored in relation to movements in the y and/or x directions with the aid of the recorded acoustic signals or noise signals. In particular, the movement profile of the object is monitored for a possible collision with the aid of the noise analysis, and when a collision risk is identified, information or a control signal is delivered to a control or regulating system. This provides a particularly straightforward active safety method for a moving object. Active accident prevention is ensured by informing and warning of possible collisions with another object.

In another advantageous embodiment of the method, information from a geographical information system, for example a navigation system, and/or from a previous noise analysis, is taken into account during the detection, evaluation and/or identification of the relevant object. This allows rapid prediction of the vehicle's own movement profile while taking into account the acoustic signals currently being recorded.

Depending on the type and embodiment, an associated priority is specified for an operator of the object, (e.g., a driver). For example, an identification and self-localization can thereby be adjusted in stages by the driver. Alternatively, or in addition, an operation with a higher priority is given precedence over an operation with a lower priority, ensuring that, for example, the driver is given higher authority than a passenger, or that safety-relevant operating steps of the proposed system are given higher authority than comfort-relevant operating steps which the driver can carry out.

Advantageously, acoustic signals, noise signals and/or other operational signals from neighboring objects and/or systems are recorded, received and/or taken into account during a relevant analysis. Such cross-referencing of a plurality of objects in a pre-determinable region (for example inside a traffic network) makes it possible to identify the traffic flow currently existing in this traffic network. With the aid of the identified traffic flow, for example, the relevant object can be navigated by corresponding signal interchange with the aid of the navigation system.

For high speed and maximum realism, the recorded acoustic signals or noise signals are processed with the aid of at least one analysis, by assigning signal patterns using neural networks and/or fuzzy logic. As an alternative or in addition, the recorded acoustic signals and/or noise signals may be compared, identified and evaluated with the aid of signal patterns stored in a table.

The invention also provides a device for detecting, evaluating and identifying a stationary and/or moving object such as a vehicle, with at least one sonic transducer system comprising a plurality of electroacoustic, electromechanical and/or mechanical transducers. The sonic transducer system has a predeterminable directional characteristic for recording acoustic signals emitted by the object or reflected by another object or by a plurality of objects. The device also includes an evaluation unit for detecting, evaluating and/or identifying the object with the aid of the recorded acoustic signals.

The sonic transducer system comprises, at least one sound or noise sensor (in particular a direction-sensitive sound sensor). The transducer is advantageously designed as a microphone with a spherical and/or lobe characteristic. In this case, the sonic transducer system and the evaluation unit preferably form a passive acoustic radar based on sound waves. Such a passive acoustic radar method allows particularly straightforward and fast processing of the recorded acoustic signals compared with a conventional active radar method.

For multidirectional recording of the acoustic signals or object-related noise signals, the object comprises a plurality of sound sensors. These are, for example, arranged at different places in the vehicle with different orientations, permitting direction-related self-localization of the vehicle. (For example, the direction is used in a driver assistance system.) Depending on the type and embodiment of the device (referred to below in brief as an acoustic radar) a plurality of sound sensors are combined to form a group.

For extensive recording or positioning of the object, the object-related transducer or transducers arranged in an environment have a communication link to a control center. The use of such a network of object-related noise sensors, and noise sensors arranged stationary in the environment, allows analysis of the traffic flow using the control center. To this end, the device is expediently integrated in a traffic monitoring system.

Other objects, advantages and novel features of the present invention will become apparent from the following detailed description of the invention when considered in conjunction with the accompanying drawings.

DETAILED DESCRIPTION OF THE DRAWINGS

Parts which correspond to one another are provided with the same reference numbers throughout the Figures.

Figure 1:
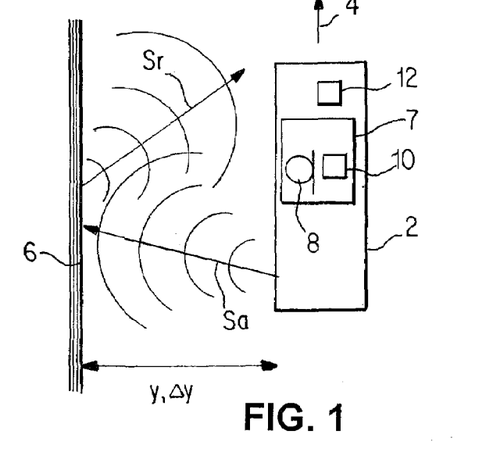
FIG. 1 schematically shows an acoustic radar for monitoring a lateral distance.

FIG. 1 shows a moving object 2 (referred to below as the vehicle 2), which is moving at a driving speed v past an object 6 (a guardrail on the left-hand side of the road lane 4), where v>0 km/h. The vehicle 2 includes a device 7 (referred to below as the acoustic radar 7) for detection and evaluation of the object 2, with a sonic transducer system 8 which comprises at least one electroacoustic, electromechanical and/or mechanical transducer designed as a sound or noise sensor 8. The acoustic radar 7 is in this case a component of a driver assistance system (not shown in detail), or alternatively, it may be a component of an integrated traffic monitoring system (not shown in detail).

The sound sensor 8 (for example, a direction-sensitive microphone) has a spherical or lobe characteristic. Acoustic signals Sa emitted by the vehicle 2, and/or acoustic signals Sr reflected by the other object 6 (the guardrail) are recorded using the sound sensor 8 as a sonic pressure level Spa or SPr, respectively.

The acoustic radar 7 furthermore comprises an evaluation unit 10, which processes the acoustic signals Sa and/or Sr recorded by the sound sensor 8 to detect, evaluate and identify the object 6 (the guardrail, and/or the actual vehicle 2).

For example, the vehicle 2 is driving alongside the guardrail 6 or alongside other objects 6 such as parked automobiles, a row of houses or a wall, at a small lateral distance y away from it. While driving, the signals Sa emitted by the vehicle 2 (for example, its operational noises such as engine noise, transmission noise and tire noise), and the reflection signals Sr of the vehicle's own operational noises Sa returning to the vehicle 2 from the guardrail 6, are recorded using the sound sensor 8 integrated, for example, in the vehicle door handle.

When there is a decreasing lateral distance ($\Delta y<0$), the transmission ratio between the emitted operational noise Sa and the sonic pressure level SPr measured in the sound sensor 8 increases significantly. That is, there will be a stronger reflection of the emitted operational noise Sa or, when there is a constant lateral distance ($\Delta y=0$), the emitted operational noise Sa will be louder. An increasing or decreasing lateral distance, $\Delta y>0$ or $\Delta y<0$, will be identified by comparing previous and currently recorded reflection signals Sr using the evaluation unit 10. In this case, it will be deduced from a rapidly increasing or decreasing sonic pressure level SPr that there is a rapidly decreasing or increasing lateral distance $\Delta y$, y. When the sonic pressure level SPr, or of its variation as a function of time, falls below or exceeds critical limit or threshold values G, a risk situation will be detected and evaluated. Optionally, a warning message will be delivered and/or a control signal will be transmitted to a control and/or regulating system, for example a driver assistance system.

The so-called acoustic distance law is used in order to calculate the distance y between the two objects (i.e., between the vehicle 2 and the guardrail 6). This involves using the typical behavior of line sources (sonic pressure level inversely proportional to the distance between the microphone and the sound source: $SP \sim 1/r$) or point sources (sonic pressure level inversely proportional to the square of the distance between the microphone and the sound source: $SP \sim 1/r^2$) as a function of the instantaneous operational state of the relevant object (i.e., of the actual vehicle 2). The acoustic Double effect occurring when sound sources (vehicle 2 and guardrail 6) and associated sensors (sound sensors 8) are in motion relative to one another is in this case used for the signal and noise analyses according to Table 1, by which frequency corrections and/or speed corrections are carried out.

TABLE 1

| Noise source (object 6) | Observer (actual vehicle 2) | Observed frequency |
|---|---|---|
| • | ←• | $f_B = f_Q \cdot (1 + v_B/c)$ |
| • | •→ | $f_B = f_Q \cdot (1 - v_B/c)$ |
| •→ | • | $f_B = f_Q/(1 - v_Q/c)$ |
| ←• | • | $f_B = f_Q/(1 + v_Q/c)$ |
| •→ | ←• | $f_B = f_Q \cdot (c + v_B)/(c - v_Q)$ |
| ←• | •→ | $f_B = f_Q \cdot (c - v_B)/(c + v_Q)$ |
| ←• | ←• | $f_B = f_Q \cdot (c + v_B)/(c + v_Q)$ |
| •→ | •→ | $f_B = f_Q \cdot (c - v_B)/(c - v_Q)$ | with $f_B$=the frequency perceived by the observer (for example the frequency recorded by a noise sensor), $f_Q$=the frequency of the noise source, $v_B$=the speed of the observer, $v_Q$=the speed of the noise source and c=the speed of sound.

As an alternative or in addition, a movement profile of the vehicle 2 is determined using a geographical information system 12, for example a navigation system, with the aid of GPS signals (GPS=global positioning system). The geographical information system 12 allows only rough determination of the movement profile of the vehicle 2, since the maximum accuracy of the position determination by the information system 12 is about ±10 m for civil applications. For optimization (and therefore for maximum accuracy in determining the movement profile of the vehicle 2), the vehicle position is constantly determined and updated using the evaluation unit 10, with the aid of a combination of the information system 12 with the acoustic radar 7. In other words: the acoustic radar 7 is used to determine the strength of the near-field reflections of the vehicle's own driving noises from the guardrail 6 as a measure of the lateral distance Δy, y from the guardrail 6, and therefore as a measure of the movement state of the vehicle 2, and the global position of the vehicle 2 in a traffic network is determined, analyzed and evaluated with an accuracy that is as good as possible by combination with data from the information system 12.

Figure 2:
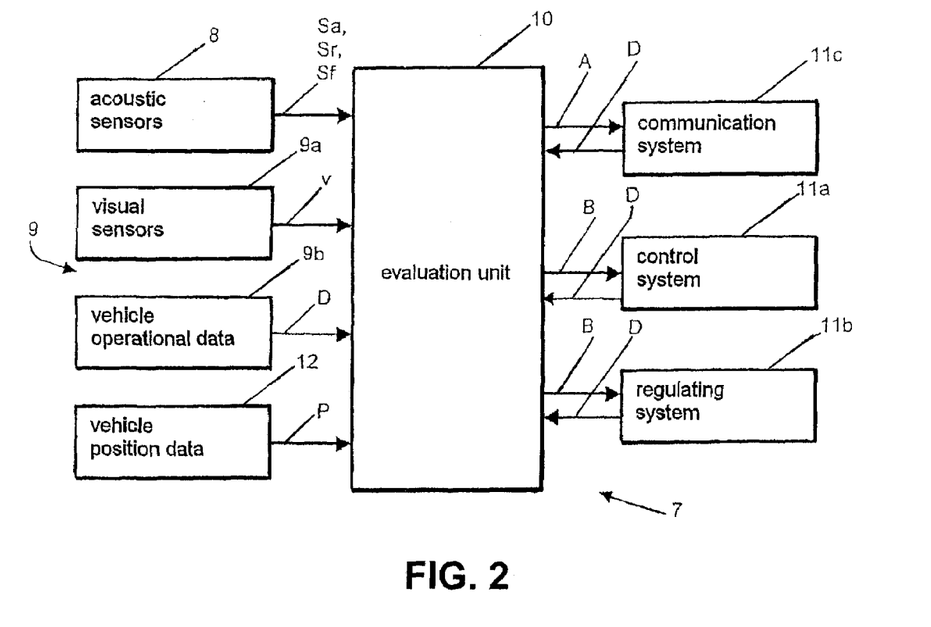
FIG. 2 is a schematic block diagram of an acoustic radar with a sonic transducer system and an evaluation unit.

FIG. 2 shows a block diagram of the acoustic radar 7, with the evaluation unit 10 and the sonic transducer system 8. Depending on the type and embodiment of the acoustic radar 7, it may be combined with other detection systems 9. For example, an optical detection unit 9a, for example a CCD camera, may be provided for the visual detection of neighboring objects (i.e., the guardrail 6 or another vehicle driving past). In order to take vehicle-related data into account, vehicle-specific data D are recorded by relevant sensors 9b, for example the tachometer. Vehicle-specific position data P are recorded using the information system 12 and sent to the evaluation unit 10. With the aid of a noise and/or signal analysis, the vehicle-specific data D, optical data V, position data P and noise data Sa, Sr, Sf, recorded using the information system 12, the detection systems 9 and/or the sonic transducer system 8, are processed using the evaluation unit 10 to form control signals B and/or display signals A for a control and/or regulating system 11a, 11b or for a communication system 11c. Depending on the type and embodiment of the acoustic radar 7, data D from the control and/or regulating system 11a, 11b, or from the communication system 11c, may be taken into account during the noise and/or signal analysis. The communication system 11c is then used, in particular, for data interchange with a traffic management system (not shown in detail) or a control center. For example, data of neighboring objects 6, such as other vehicles 2, and/or data of transducers or monitoring systems arranged in the environment, are communicated via this data interchange and may be taken into account during the signal and noise analysis.

Figure 3:
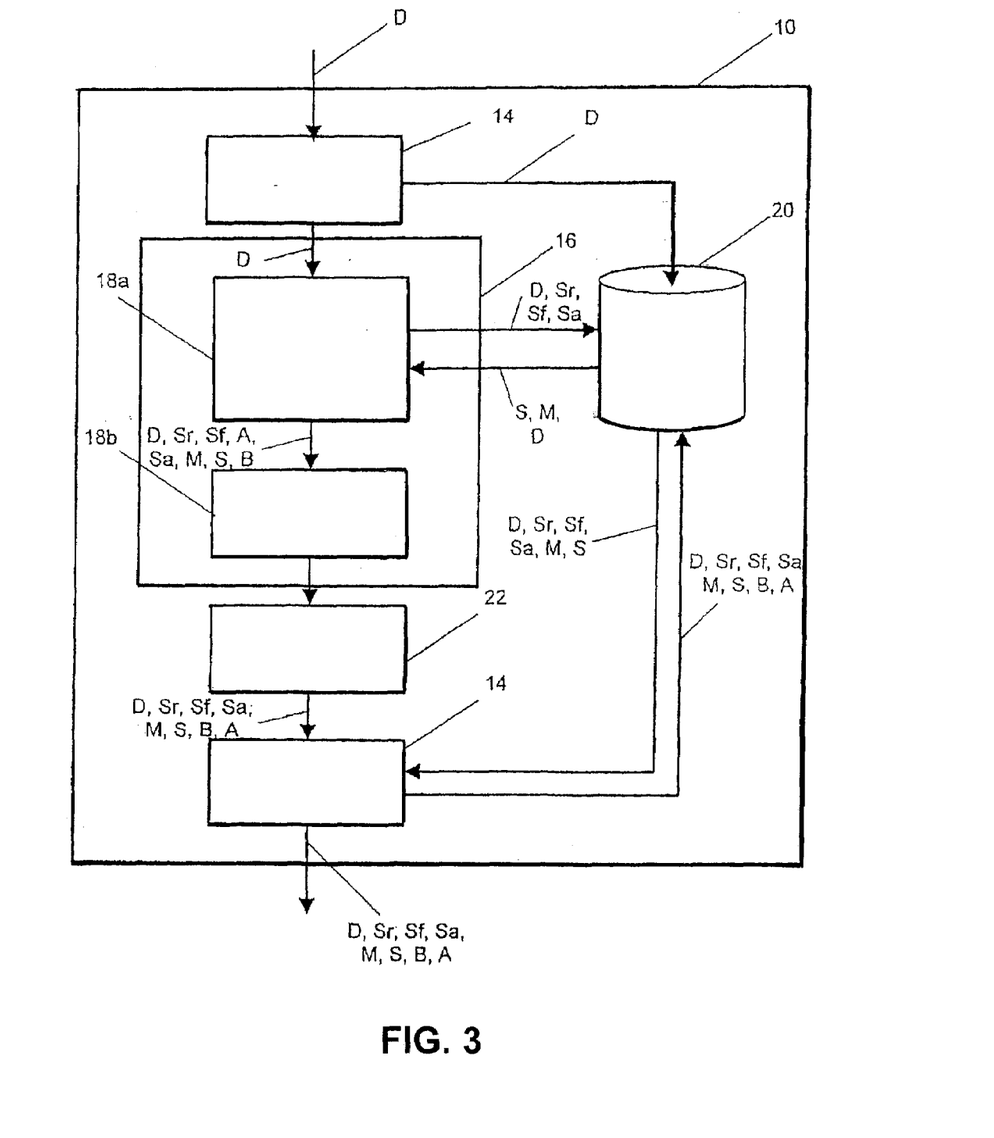
FIG. 3 is a schematic block diagram of the evaluation unit according to FIG. 2 with an analysis and evaluation module.

FIG. 3 schematically represents the basic structure of the evaluation unit 10, which in this case comprises two interface modules 14 for handling input and/or output data D (Sa, Sf, Sr, Su, Ss, V, A, B). For the signal and noise analysis, the evaluation unit 10 has an analysis module 16 which comprises a calculation and evaluation module 18a and/or a logic module 18b. For pattern recognition of recorded noise signals Sa, Sf, Sr, Su, Ss, if such is required, with reference patterns M or comparative patterns characteristic of noises sources, a data memory 20 is provided for storing current data D, signals S and/or reference patterns M. A prioritization module 22 is furthermore provided for prioritization of input and/or output data D. The functional principle of the analysis module 16 of the acoustic radar 7 is represented in more detail in FIG. 4 with the aid of a block diagram.

Figure 4:
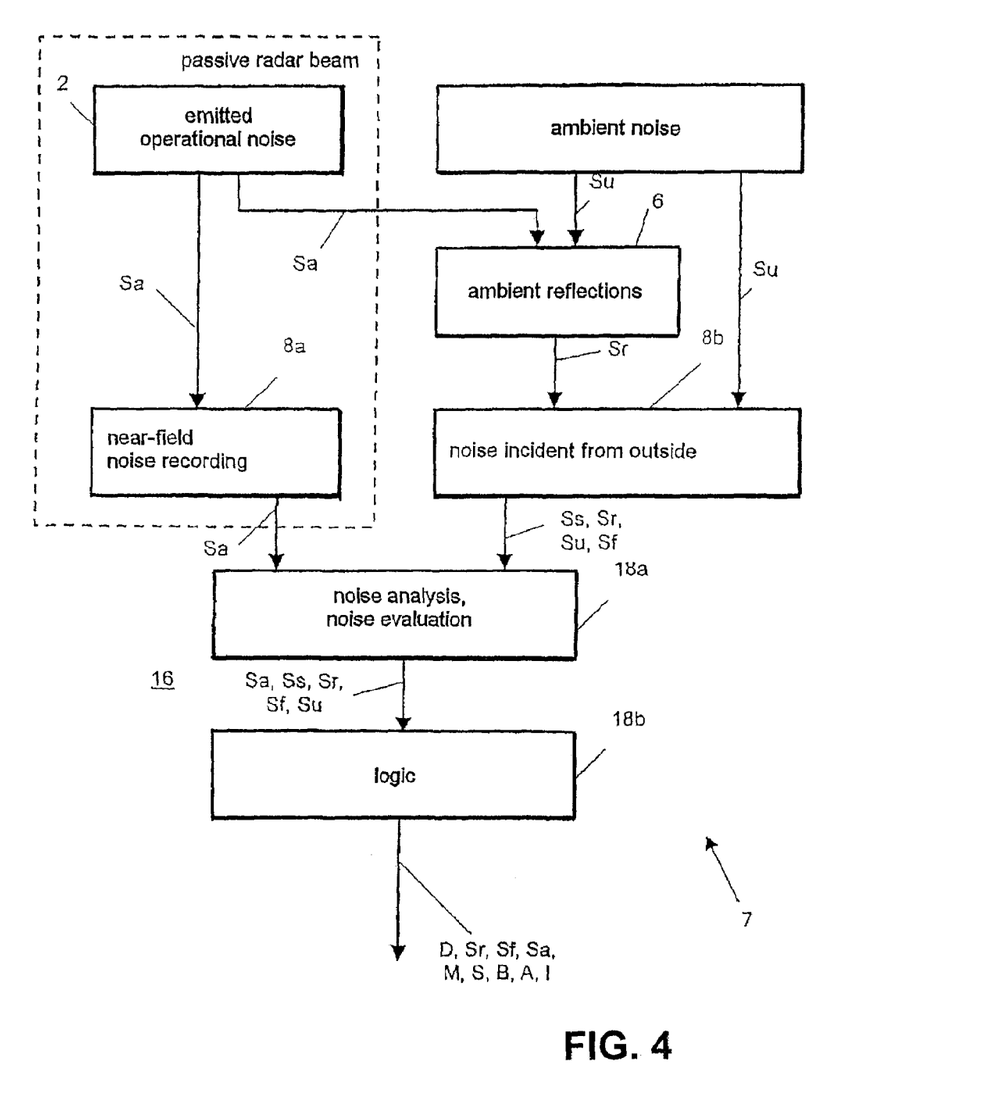
FIG. 4 is a schematic block diagram of the functional principle of the analysis and evaluation module according to FIG. 3.

In this case, the operational noise Sa emitted by the vehicle 2 (i.e., its own operational noise) and reflections thereof from the guiderail 6 as a reflected noise signal Sr, are recorded using the sonic transducer system 8 as a so-called passive radar beam. In order to record the vehicle's own operational noise Sa (i.e., for the near-field noise recording), the sonic transducer system 8 has correspondingly positioned sound sensors 8a, such as microphones. The reflected noise signal Sr and ambient noises Su, and reflections thereof, are recorded using other sound sensors 8b positioned according to their function, and are sent separately, or as a sound total signal Ss, to the calculation and evaluation module 18a. The noise signals Sa, Sr, Sf, Su, Ss are processed, analyzed and evaluated with the aid of the signal and noise analysis, with a view to detection, evaluation and/or identification of the other object 6, for example the guiderail, and/or of the actual vehicle 2, using pattern recognition, signal separation and/or signal extraction. Information I, the display signal A or the control signal B will optionally be delivered via the interface module 14 to the communication system 11c and/or the control and/or regulating system 11a, 11b. Depending on the degree of functionality or analysis, the evaluated noise signals Sa, Sr, Sf, Su, Ss will be sent to the logic module 18b for further processing.

Figure 5:
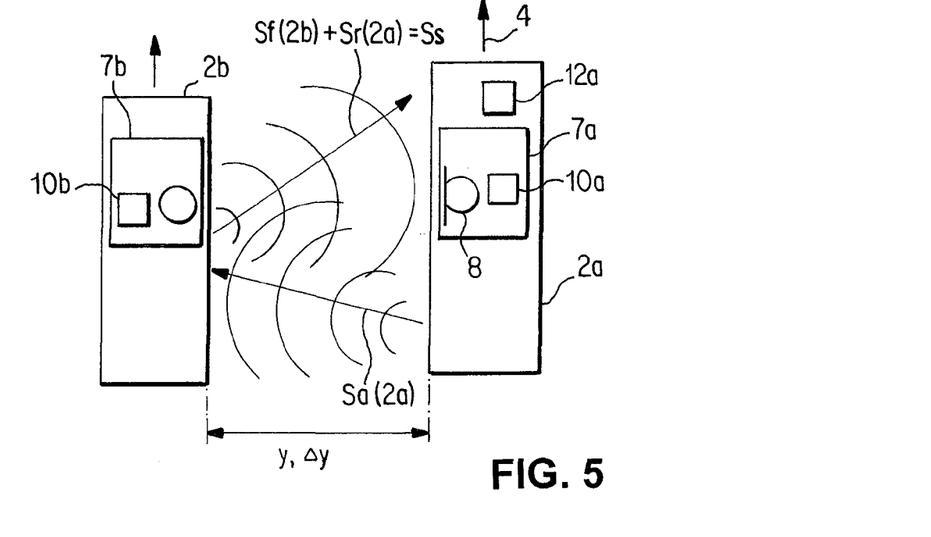
FIGS. 5 to 6 show schematically an acoustic radar for monitoring a distance between two objects moving relative to each other.

The principle, described very generally here, of the signal processing using the evaluation unit 10 will be described in more detail below with reference to exemplary embodiments. FIG. 5 shows an application of the acoustic radar 7, in which two vehicles 2a and 2b driving next to one another each comprise an associated acoustic radar 7a and 7b. In this case, a total sound signal Ss formed by the vehicle's own operational noises Sa, reflections of the vehicle's own operational noises Sr and extraneous operational noises Sf (noise components not correlating with the pattern in the sound signals Sr), are recorded using the respective acoustic radar 7a, 7b. The recorded sonic pressure level SPs of the total sound signal Ss and its behavior as a function of time are analyzed and evaluated in a manner similar to that in the method according to FIG. 1, using the evaluation unit 10 with the aid of pattern comparison, time-of-flight determination and/or combination with GPS signals. In this case the movement direction, the speed of the associated vehicle or the other vehicle 2a, 2b, respectively, and/or of the lateral distance Δy, y from one another, are determined and optionally evaluated using the respective evaluation unit 10a, 10b (i.e., in a vehicle-related way).

Depending on the type and embodiment of the acoustic radar 7a, 7b, for example tire noises, transmission noises, engine noises and/or driving noises, may be determined and analyzed for the vehicle 2a, 2b as its own driving or operational noises. To this end, the respective acoustic radar 7a, 7b comprises a plurality of sound sensors 8 arranged at different positions in the respective vehicle 2a, 2b. In order to determine the tire noises, for example, the sound sensor 8 is arranged as a microphone in the wheel arch. In order to determine the engine noise, the associated sound sensor 8 is arranged in the engine compartment. The operational noises Sa respectively emitted by the actual vehicle 2a or 2b and sound signals Sr reflected by the other vehicle 2b or 2a, respectively, are recorded using the sound sensor 8 arranged, for example, in the door handle. The operational and movement state of the actual vehicle 2a or 2b, respectively, is determined and evaluated using the evaluation unit 10a, 10b with the aid of a pattern analysis (i.e., by a comparison of the recorded reflected sound signals Sr with patterns stored for the respective noise). Noise components not correlating with the pattern in the sound signals Sr are identified as extraneous operational noise Sf or extraneous effects on the vehicle 2a, 2b. As in a conventional radar system, the distance from the reflection surface, for example the lateral distance Δy, y, is determined with the aid of the time of flight of the emitted sound signals Sa and the received reflected sound signals Sr.

Figure 6:
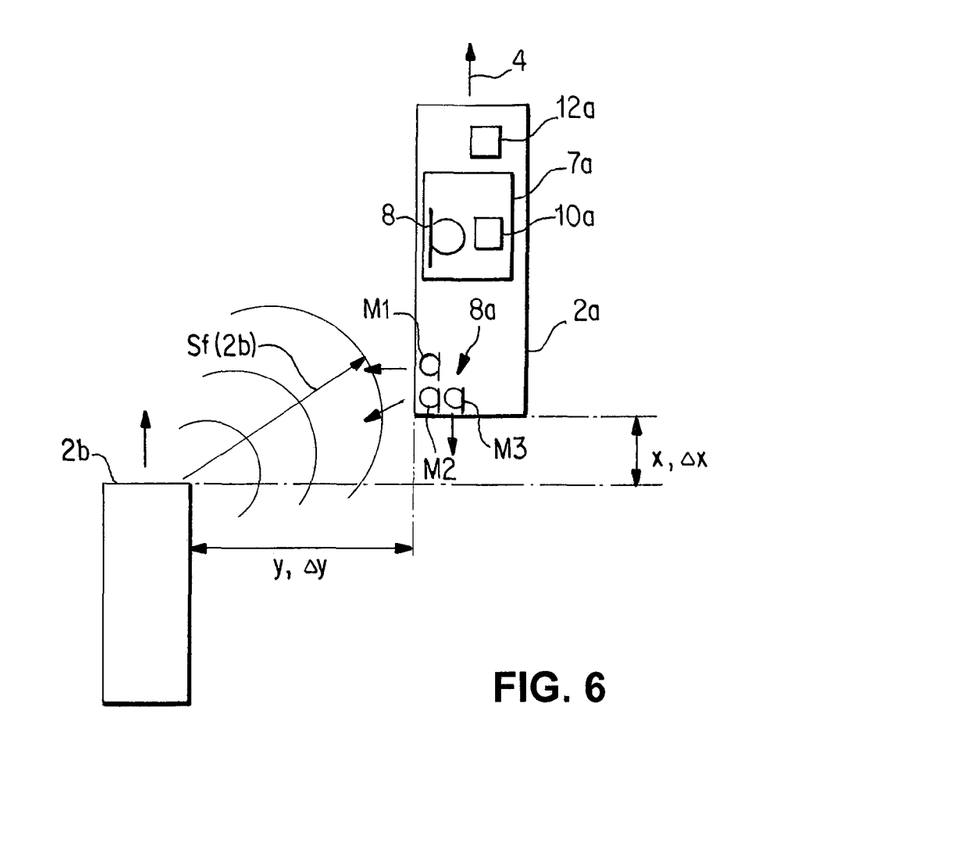

FIG. 6 shows another application of the acoustic radar 7. In this case, a second vehicle 2b is driving in the blind spot behind the vehicle 2a, which is driving in the same direction. In the leading vehicle 2a, the acoustic radar 7a comprises a plurality of sound sensors 8a arranged in the left-hand tail area. With the aid of these sound sensors 8a arranged in the left-hand tail area of the vehicle 2a, extraneous operational noises (i.e., the sound signals Sf of the other vehicle 2b), are detected even before the vehicle is seen, (for example when driving over the top of a hill or round a bend), analyzed using the evaluation unit 10a and allocated to the other vehicle 2b. To this end, a risk situation is detected or projected using the evaluation unit 10a, by correlating the recorded sonic pressure level SPf of the other vehicle 2b with the lateral and/or longitudinal distance Δy, y or respectively Δx, x of the two vehicles 2a and 2b from one another. Depending on the type and embodiment of the sound sensors 8a, high-frequency operational noises Sf of the other vehicle 2b (for example, tire noises), can be recorded with the aid of individual direction-sensitive microphones M1 to M3. The operational noises Sf are allocated to the origin using the evaluation unit 10a with the aid of a pattern analysis.

Figure 7A:
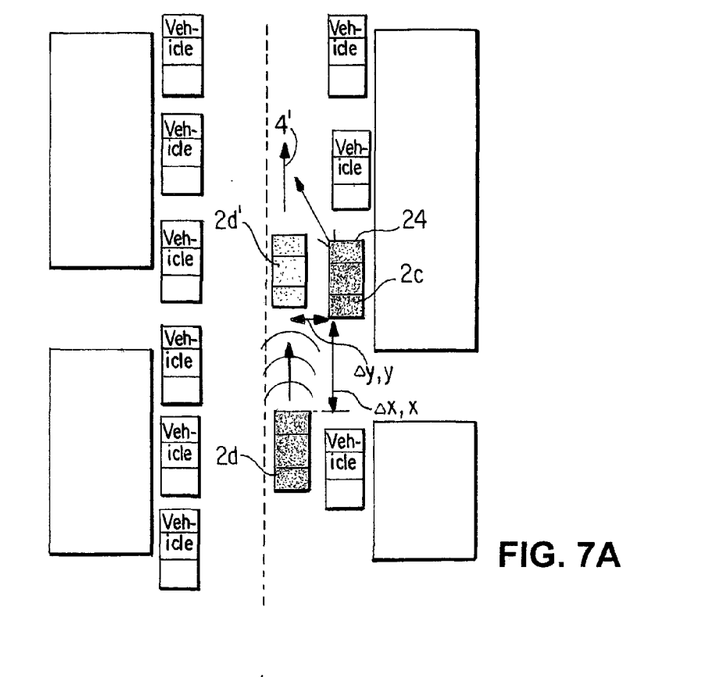
FIGS. 7A and 7B show schematically an acoustic radar for monitoring a starting-off procedure of a vehicle.
Figure 7B:
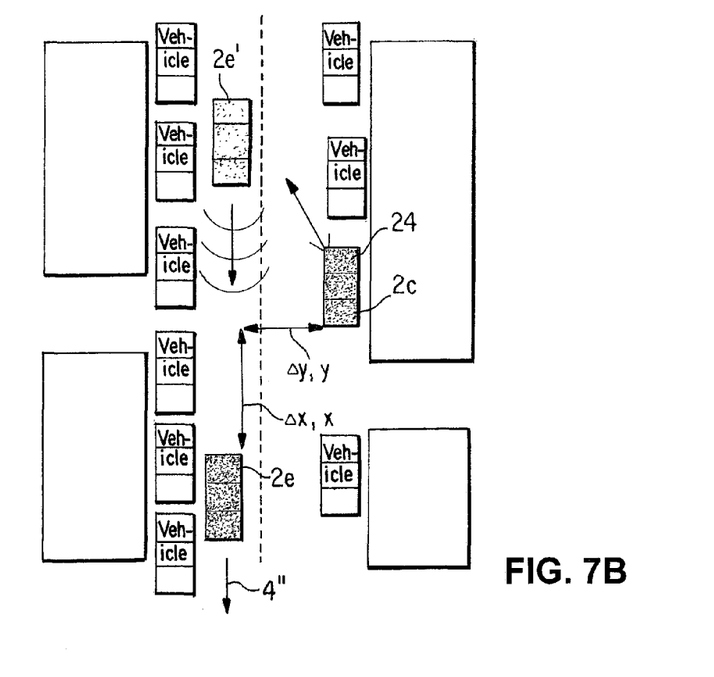

FIGS. 7A and 7B show an application of the vehicle-related acoustic radar 7c for a vehicle 2c which is starting off from a parking space 24 at the side of the road. In order to avoid a risk situation due to an inattentive driver of the vehicle 2c, a vehicle 2d driving on the same lane 4' and/or a vehicle 2e driving on the opposite lane 4" is detected using the acoustic radar 7c and evaluated with respect to its lateral and/or longitudinal distance Δy, y or respectively Δx, x from the vehicle 2c. In this case the acoustic radar 7c is designed for multidirectional recording of the vehicle's own acoustic signals Sa, Sr and/or the extraneous acoustic signals Sf. In other words, using the evaluation unit 10c, a lane is allocated to the recorded and identified other object (i.e., a vehicle 2e driving past), a profile or movement prognosis (and consequently the current driving-dynamic state of the vehicle 2e driving past) is determined and projected. If the distance y and/or x falls below a minimum value G that is necessary for starting off from the parking space, then an acoustic and/or optical warning message is delivered to the driver of the vehicle 2c using the evaluation unit 10c. Optionally, the vehicle 2c is prevented from exiting the parking space using a control signal transmitted to a control and/or regulating system.

Figure 8:
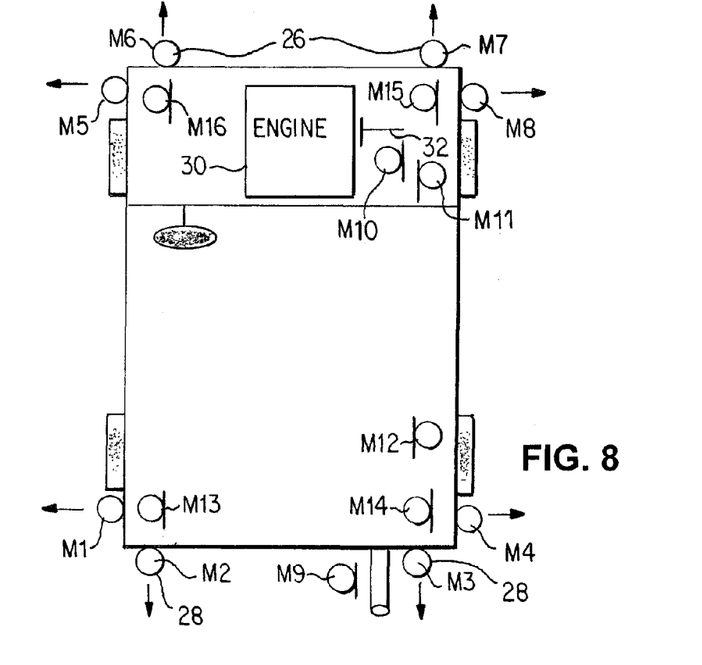
FIG. 8 shows schematically an acoustic radar with a sonic transducer system comprising a plurality of sound sensors.

FIG. 8 shows an acoustic radar 7 for multidirectional recording, comprising a plurality of microphones M1 to M16 arranged throughout the vehicle 2, especially in the front region 26 and in the tail area 28, as its sonic transducer system 8. With the aid of such a multidirectional microphone arrangement, typical operational noises of the actual vehicle and/or extraneous operational noises, Sa, Sr, Sf, Ss (for example ignition frequency, engine noise, tire noise) are identified in a vehicle-related manner, localized and evaluated using the evaluation unit 10 by pattern analysis and/or pattern recognition. To this end, relevant diagrams (e.g., frequency-rpm diagrams for typical system excitations, engine-load pattern diagrams, or engine-ignition frequency pattern diagrams, engine-transmission pattern diagrams) are stored in a data memory in the evaluation unit 10. Localization (determination of the position of the other vehicles 2b, 2d, 2e relative to the actual vehicle 2a or 2c) is carried out by comparing the amplitude values of the sonic pressure level SP received by the microphones M1 to M16 and while taking into account the vehicle's own operational noises Sa, and/or the vehicles own reflected operational noises Sr, using the dominant incidence direction of the extraneous operational noises Sf The microphones M1 to M16 are to this end arranged appropriately at different places in the vehicle 2, 2a to 2e, according to their function.

Furthermore, the microphones M1 to M16 have an appropriate directional characteristic according to function and position. For example, the microphone M10 is arranged at the engine 30 in order to record the vehicle's own engine noise with the aid of the air-borne sound. As an alternative or in addition, a structure-borne sound sensor 32 is arranged at the cylinder block in order to record the structure-borne sound. A functional relationship resulting from the recorded structure-borne sound signals of the structure-borne sound sensor 32 and the recorded air-borne sound signals of the microphone M10 are stored in the form of performance data in the evaluation unit 10 for the noise analysis, while taking the rpm, load and other operational parameters of the engine into account.

In order to record other operational noises, for example exhaust noises or tire noises, microphones M9 and M11, M12 are accordingly positioned immediately next to the exhaust 34 and the tire 36, respectively. Relevant performance data or tables are stored for the noise analysis in this case.

In order to record extraneous operational noises Sf, other microphones M13 to 16 are preferably arranged in the left-hand and right-hand parts of the front area 26 and/or of the tail area 28, especially in the transition region from the respective longitudinal side to the tail and/or front area. The microphones M9 to M16 expediently have a spherical characteristic.

In order to determine the incidence direction of extraneous operational noises Sf, and hence to determine the movement profile of another vehicle 2d, 2e approaching the actual vehicle 2c, directional microphones M1 to M8 are arranged in all the incidence directions. For example, two mutually separated directional microphones M2, M3 and M6, M7 are respectively arranged in the tail area 28 and in the front area 26, in order to determine noise signals Sf incident from behind or noise signals Sf incident from the front, respectively. In order to determine laterally incident noise signals Sf, two mutually separated directional microphones M1, M5 and M4, M8 are arranged on each longitudinal side of the vehicle. Depending on the type and embodiment of the acoustic radar 7, other directional microphones M1 to M8 may be provided in order to determine the incidence direction, especially in order to track the movement profile of another object, for example a vehicle or pedestrian.

To this end, the acoustic radar 7 is used in the following way for the exemplary embodiments represented in FIGS. 7A, 7B. If, as represented in FIG. 7B, a vehicle 2e is behind the vehicle 2c (which exits the parking space) and distant from it (i.e., the distance $\Delta x>0$ becomes larger and the associated sonic pressure level SP decreases), then this vehicle 2e is evaluated as noncritical. Depending on the time at which the vehicle 2c is switched on, and the associated acoustic radar 7c is therefore switched on, the vehicle 2e driving on the opposite road lane is identified as a vehicle 2e' approaching from the front and has its entire movement profile tracked until it leaves the range of the acoustic radar 7c. This movement profile is evaluated as noncritical using the evaluation unit 10c since while approaching from the front, the vehicle 2e' was within the field of view of the driver of the actual vehicle 2c starting off and is distant after leaving the field of view of the actual vehicle 2c starting off.

Furthermore, as shown in FIG. 7A, the vehicle 2d, likewise located behind the vehicle 2c, is identified, using the evaluation unit 10c with the aid of the rising sonic pressure level SP and the decreasing distance $\Delta x$, x and/or $\Delta y$, y, and it is determined that the vehicle 2d is not coming from the front, but approaching the actual vehicle 2c from behind. Therefore, a warning is delivered to the driver of the vehicle 2c starting off and/or to the driver of the approaching vehicle 2d using the evaluation unit 10c.

In order to be able to filter out operational noise Sa of the actual vehicle 2a or 2c, which may cause interference in the microphones M1 to M8, the associated noise patterns of the vehicle 2a, 2c are recorded directly at the respective point of origin. For example, the tire noise on the driving and/or driven axis, the noise at the gas outlet of the exhaust, the air-borne sound in the engine compartment and the structure-borne sound at the cylinder block are recorded using associated and correspondingly arranged microphones M12, M9, M10, or the structure-borne sound sensor 32. In particular, methods of artificial intelligence, neural networks and/or fuzzy logic are used during the noise analysis.

In order to determine movement profiles, and in particular to avoid collisions, the distance of objects is determined according to two different methods. Collation of the two results leads to increased accuracy. Depending on the type and embodiment, it is possible to use one or both methods, with or without collation. The two methods will be explained in detail with reference to a multi-sensor arrangement, or sonic transducer system 8, schematically represented in FIG. 9.

Figure 9:
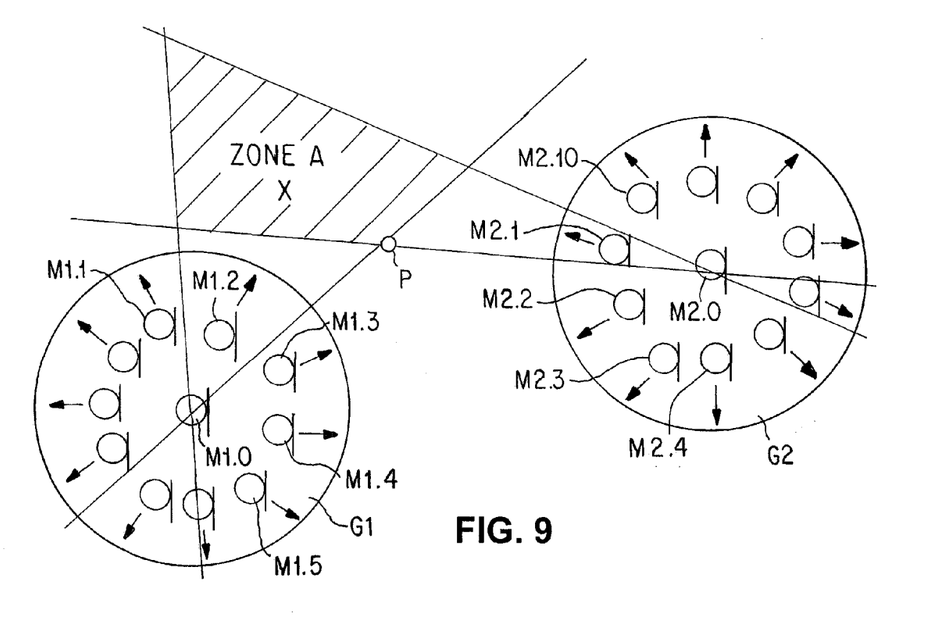
FIG. 9 shows schematically a sonic transducer system according to FIG. 8 comprising a plurality of microphone groups.

The first method uses the directional characteristic of different microphones M1.1 to M1.10 and M2.1 to M2.4 at different positions (also referred to as measurement points), in order to allocate extraneous operational noises Sf of another object X to a direction. The intersection of direction sectors that originate from different measurement points is used in this case in order to determine the point of origin of the noise signal Sf recorded in at least two directional microphones M1.1 to M1.10 and M2.1 to M2.10. In this case, the microphones M1.1 to M1.10 are arranged in a circle and connected together to form a group G1, in the middle of which a central microphone M11.0 with a spherical characteristic is arranged. The microphones M1.1 to M1.10 are directional microphones, for example with a lobe characteristic, and together they have a circular characteristic owing to their circular arrangement and the orientation thereof in the outward direction.

Similarly, the microphones M2.1 to M2.10 are also arranged circularly around a central microphone M2.0 and so as to form a group G2. In this case, the group G2 is arranged farther away from the noise source X than the group G1. The two groups G1 and G2 are components of the sonic transducer system 8 of an associated object, for example the actual vehicle 2a or 2c. In this case, the one group G1 of microphones M1.0 to M1.10 is arranged in the left-hand tail area, for example, and the other group G2 of microphones M2.0 to M2.10 is arranged in the left-hand front area in order to detect other stationary or moving objects X on the relevant longitudinal side of the vehicle 2a or 2c.

If an object X in zone A is emitting a noise signal Sf in all directions, for example, it will be recorded using the central microphones M1.0 and M2.0 of the groups G1 and G2, respectively. With the aid of a pattern analysis using the evaluation unit 10, the noise signal Sf will be allocated to the same object X as its origin if there is a sufficient match. Allocation to a direction sector is carried out by each group G1 or G2, since noise patterns detected in the central microphones M1.0 and M2.0 have the highest respective sonic pressure level SP out of all the directional microphones M1.1 to M1.10 and M2.1 to M2.10 in the relevant directional microphones M1.2 and M2.1 of the two groups G1 and G2, respectively.

Due to the closer positioning of the group G1 to the noise source, or to the object X, the noise signal Sf will be detected with a higher sonic pressure level SPf in the group G1 than in the group G2. With the aid of the positions of the two groups G1 and G2 and with the aid of the determined relevant directional microphones M1.2 and M2.1, the zone A (i.e., the localization region of the noise source X, represented as shaded) is determined using the intersection of the direction sectors associated with the two directional microphones M1.2, M2.1.

Expediently, such microphone groups G1 and G2 in the vehicle 2 are in the corner regions at the transition from the longitudinal side to the front area and/or from the longitudinal side to the tail area at the four corners, i.e., at the rear left and/or right in the tail area and/or at the front left and/or right in the front area. A potentially collision-relevant position with a noise-emitting object X is in this case expediently related to an individual zero-point of a multidimensional coordinate system for the object X and its analysis cycle; this position lies closest to the vehicle 2 and therefore at the point P of the relevant zone A with the highest collision risk.

The second method uses the time-of-flight differences of the noise signal Sf to the central microphones M1.0, M2.0 which have a spherical characteristic. A pattern analysis allocates the noise signal Sf recorded at the central microphones M1.0, M2.0 to the same origin when there is a sufficient match.

That microphone M1.1 to M1.10, M2.1 to M2.10 which first records the noise signal Sf is expediently determined as the zero-point of the multidimensional coordinate system. I.e., the relevant microphone M1.2 according to FIG. 9 is the microphone lying closest to the object X causing the noise.

The noise signal Sf recorded by the two central microphones M1.0, M2.0 which have a spherical characteristic is furthermore taken into account during the analysis. The time lag of the noise incidence of the same noise signal Sf at the three measurement points M10.2, M1.0, M2.0 provides a linear equation system with the following three times of flight:

$$\Delta t_{1.0} t_{1.2} = (t_{1.0} - t_{1.2}) \Rightarrow \Delta s_{1.0} s_{1.2} = (t_{1.0} - t_{1.2}) \cdot v_c \quad [1]$$

$$\Delta t_{1.0} t_{2.0} = (t_{1.0} - t_{2.0}) \Rightarrow \Delta s_{1.0} s_{2.0} = (t_{1.0} - t_{2.0}) \cdot v_c \quad [2]$$

$$\Delta t_{1.2} t_{2.0} = (t_{1.2} - t_{2.0}) \Rightarrow \Delta s_{1.2} s_{2.0} = (t_{1.2} - t_{2.0}) \cdot v_c \quad [3]$$

From the three distances to the three microphone positions, which do not lie on a straight line, it is possible to calculate the coordinates of the noise source X in relation to the zero-point selected at the first microphone M1.2.

The reflections of ambient noises Su or the vehicle's own reflected operational noises Sr are used in order to detect noiseless (for example, stationary) objects. To this end, the pattern of the vehicle's own operational noise Sa is recorded via near-field microphones (i.e., using the one microphone M9 to M16 having a spherical characteristic) and structure-borne sound sensors 32. The reflection of the vehicle's own operational noise Sa from a noiseless object is in this case determined through the degree of pattern match of the vehicle's own operational noise signal Sa and reflected operational noise signal Sr. In other words: the vehicle's own inevitable operational noise signal Sa is essentially used as a radar signal. Under particular weather conditions, for example rain, noise-pattern components whose frequency spectrum lies outside the frequency spectrum caused by the weather conditions are furthermore evaluated. To this end, the weather conditions are on the one hand identified using stored noise patterns and taken into account using a correction factor. On the other hand, such weather conditions can be automatically taken into account during the noise analyses with the aid of the correction factor, with the aid of signals provided by external and/or internal systems.

The lateral and/or longitudinal distance $\Delta y$, y or respectively $\Delta x$, x from the recorded noise source X is progressively calculated in relation to the coordinate system of the actual vehicle 2a, 2c. A warning can be triggered using computational prognoses for a distance which is too small, or its gradient. Besides the minimum distance, the distance with respect to the coordinate axes is also monitored. A lower risk readiness is therefore possible if, for example, the lateral distance $\Delta y$, y remains constant and only the distance $\Delta x$, x in the driving direction (x axis) changes. This case corresponds to an imminent overtaking procedure by a following vehicle, which is driving on another lane.

Figure 10:
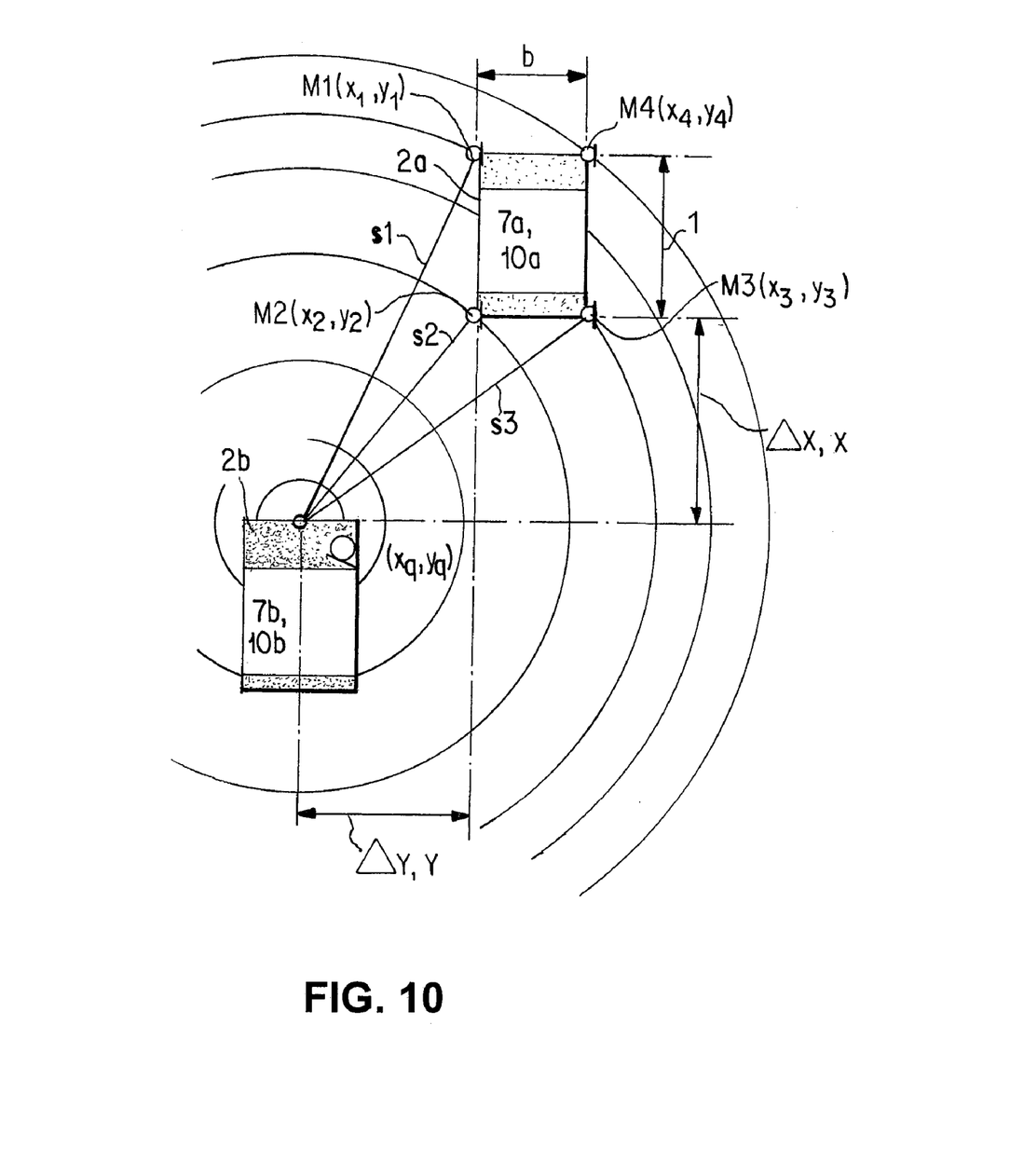
FIG. 10 shows schematically distance, speed and movement analysis of two objects moving relative to each other.

For example, FIG. 10 describes the evaluation of two mutually separated vehicles 2a, 2b with respect to their relative speed, their distance from one another and their transverse position, with the aid of the vehicle 2a equipped with the acoustic radar 7a. In this case, when a noise pattern or an extraneous noise signal Sf from the vehicle 2b appears at the microphones M1, M2, M3, their time lags $\Delta t$ are determined as follows:

$$\Delta t_{2,1} = t_1 - t_2 \quad [4]$$

$$\Delta t_{3,1} = t_1 - t_3 \quad [5]$$

$$\Delta t_{2,3} = t_3 - t_2 \quad [6]$$

To this end, the extraneous noise signals Sf recorded at the microphones M1 to M3 are provided with an associated time stamp. The time lags $\Delta t$ occurring between the microphones M1 to M3 are determined using the evaluation unit 10a, 10b with the aid of the relevant time stamps. The microphones M1 to M3 may in this case, depending on the embodiment, be individual microphones with a spherical characteristic and/or microphone groups G1 or G2 according to FIG. 9.

The noise source (i.e., the vehicle 2b driving past), is allocated a reference point Q(x,y) using the recorded direction sectors. With the aid of the reference point Q(x,y), the respective distance s of the microphones M1, M2, M3 from the vehicle 2b is determined in the following way using the evaluation unit 10a, 10b:

$$s_1 = s_2 + \Delta t_{2,1} \times c \rightarrow s_2 = s_1 - \Delta t_{2,1} \times c \quad [7]$$

with c=speed of sound $$s_3 = s_2 + \Delta t_{2,3} \times c \rightarrow s_3 = s_1 + c \times (\Delta t_{2,3} - \Delta t_{2,1}) = s_1 + \Delta t_{3,1} \times c \quad [8]$$

$$s_1^2 = (\Delta x)^2 + (\Delta y + l)^2 \quad [9]$$

with $\Delta x$=lateral distance, $\Delta y$=distance in the longitudinal direction, l=length of the actual vehicle 2a

$$s_2^2 = (\Delta x)^2 + (\Delta y)^2 \rightarrow \Delta y = \sqrt{s_2^2 - (\Delta x)^2} \quad [10]$$

$$s_3^2 = (\Delta x + b)^2 + (\Delta y)^2 \quad [11]$$

(10)–(7):

$$\Delta y = \sqrt{(s_1 - c \times \Delta t_{2,1})^2 - (\Delta x)^2} \quad [12]$$

(9)–(12):

$$s_1^2 = (\Delta x)^2 + (\sqrt{(s_1 - c \times \Delta t_{2,1})^2 - (\Delta x)^2} + l)^2 \quad [13]$$

(8)–(11)–(12):

$$(s_1 + t_{3,1} \times c)^2 = (\Delta x + b)^2 + (s_1 - t_{2,1} \times c)^2 - (\Delta x)^2 \quad [14]$$

$$s_1^2 + 2 \times s_1 \times c \times (\Delta t_{3,1})^2 = (\Delta x)^2 + 2 \times b \times \Delta x^2 + b^2 + s_1^2 - 2 \times s_1 \times c \times \Delta t_{2,1} + c^2 \times (\Delta t_{2,1})^2 - (\Delta x)^2 \quad [15]$$

$$s_1 \times (2 \times c \times t_{3,1} + 2 \times c \times t_{2,1}) = 2 \times b \times \Delta x + b^2 + c^2 \times (t_{2,1})^2 \quad [16]$$

$$s_1 = \frac{2 \times b \times \Delta x + b^2 + c^2 \times (\Delta t_{2,1})^2}{2 \times c \times (\Delta t_{3,1} + \Delta t_{2,1})} \quad [17]$$

(13)–(17)

-continued $$\left(\frac{2 \times b \times \Delta x + b^2 + c^2 \times (\Delta t_{2,1})^2}{2 \times c \times (\Delta t_{3,1} + \Delta t_{2,1})}\right) = (\Delta x)^2 + \left(\sqrt{\left(\frac{2 \times b \times \Delta x \times b^2 + c^2 \times (\Delta t_{2,1})^2}{2 \times c \times (\Delta t_{3,1} + \Delta t_{2,1})} - c \times \Delta t_{2,1}\right) - (\Delta x)^2} + l\right)^2$$ [18]

The path $s_2$ is determined by solving Equation 18 for $\Delta x$ and substituting $\Delta x$ in Equation 17 and substituting $s_1$ in Equation 7. Other noise analysis algorithms are stored in the evaluation unit 10 in a similar way to this, depending on the type and embodiment of the respective sonic transducer system 8 of the acoustic radar 7.

Figure 11:
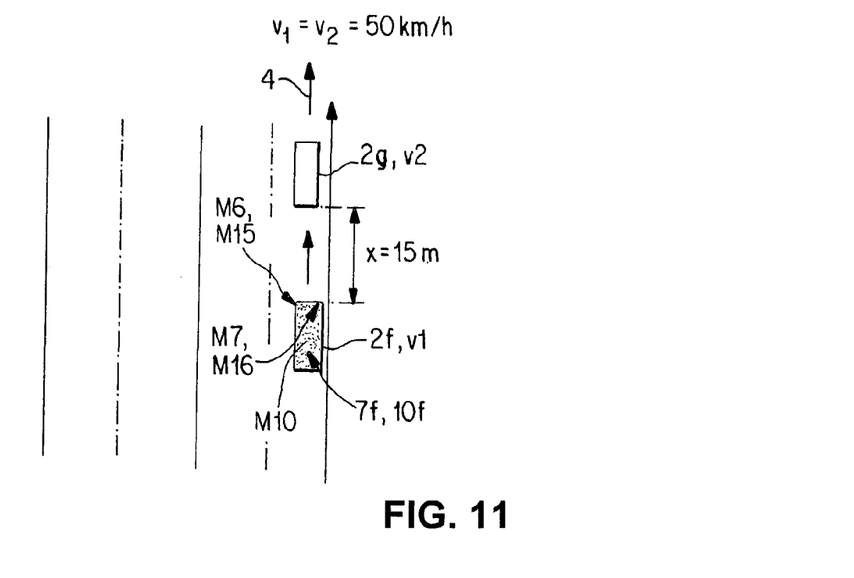
FIG. 11 shows schematically an acoustic radar for monitoring the longitudinal distance between two objects moving relative to each other.

FIGS. 11 to 12A to 12C show various examples of the use of the acoustic radar 7 when driving a vehicle 2f. In FIG. 11, for example, the vehicle 2f is driving at a speed v1 50 km/h. A second vehicle 2g with a different transmission is driving at a distance x of 15 m in front with a speed v2 of likewise 50 km/h. Both vehicles 2f, 2g are powered, for example, with a four-stroke engine and each drive at this speed v1, v2 in $3^{rd}$ gear. The superposition of the outwardly emitted operational noises Sf of the vehicle 2g in front and the emitted operational noises Sa of the actual vehicle 2f are a recorded and evaluated using the microphones M15 and M16 and with the aid of the associated evaluation unit 10f of the vehicle 2f.

Due to the arrangement of the microphones M15 and M16 in the vehicle 2f (and therefore due to the small distance of the microphones M15 and M16 from the noise sources of the actual vehicle 2f), its operational noise Sa will be recorded with a substantially higher sonic pressure level SPa than the operational noise Sf of the vehicle 2g driving in front. Depending on the design of the relevant engines, the respective operational noise Sf or Sa of the vehicle 2g or 2f, respectively from the relevant ignition frequency of the respective vehicle 2g or 2f (corresponding to the respective second engine arrangement in this case) will dominate. Using a fast Fourier transformation of the total sound signal Ss, (Ss=Sf+Sa) received in the microphones M15 and M16, the two ignition frequencies are identified (as a consequence of the different transmissions) as sinusoidal tones of different frequency. The sinusoidal tone $f_1$ of the vehicle 2f is in this case also recorded in the microphone M10 as a reference of the operational noise Sa, and allocated unequivocally to the vehicle 2f owing to the correlation of the microphone M10 with the microphones M15 and M16.

Due to the shielding effect of the engine compartment of the vehicle 2f in respect of external noises (and therefore in respect of the extraneous operational noise Sf of the vehicle 2g), the frequency $f_2$ of the vehicle 2g measured in the microphones M15 and M16 is not measured in the microphone M10 of the vehicle 2f. The frequency f2 is therefore identified as extraneous noise Sf and allocated to the vehicle 2g driving in front with the aid of the sonic pressure level SP recorded using the directional microphones M6 and M7.

Various noise analyses are carried out using the evaluation unit 10f in the relevant vehicle 2f, i.e., in the vehicle 2f comprising the acoustic radar 7f. For example, significant noise components are specified in the following way by special analyses of the gradients of the level and frequency profiles of the recorded noise signals Sa, Sf, Ss:

If, for example on the highway 4 with two lanes per driving direction, the vehicle 2g is driving at the constant speed v2 of 50 km/h in the right-hand lane, and the second vehicle 2f is initially driving at the same speed of 50 km/h in the same lane at a distance of 30 m behind in $3^{rd}$ gear, then its operational noise Sf will be recorded as a stationary noise pattern by the vehicle 2g driving in front, because neither the sonic pressure level SP nor the frequencies f change when there is a constant rpm and load, and with a constant longitudinal distance $\Delta x=0$.

Figure 12A:
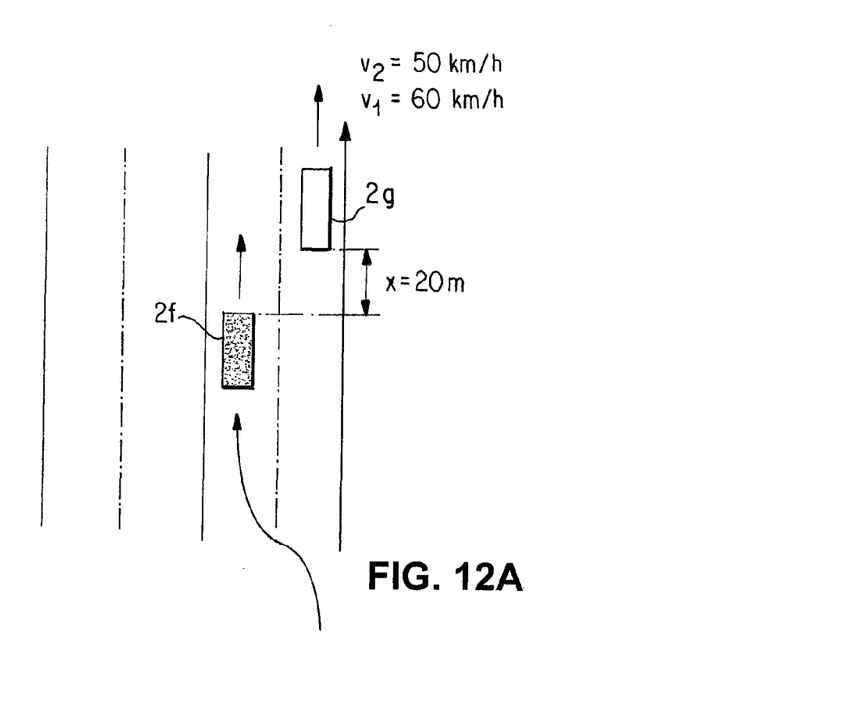
FIGS. 12A to 12C show schematically an acoustic radar for monitoring the movement profile of two objects moving relative to each other.
Figure 12B:
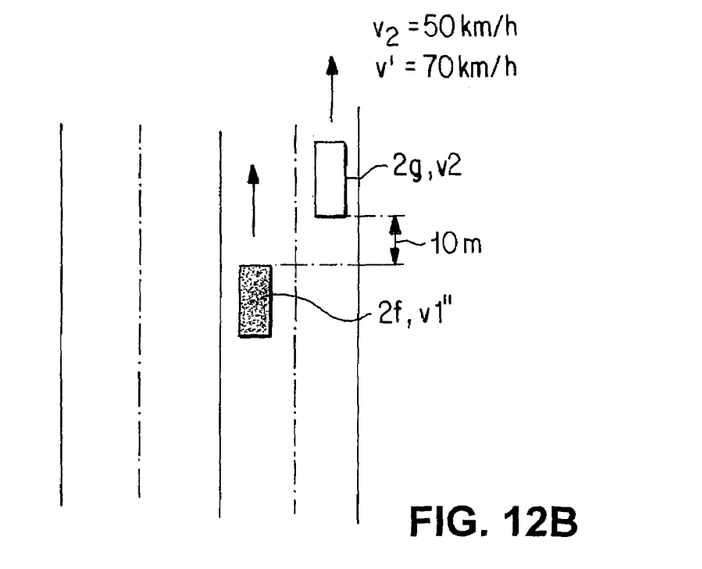
Figure 12C:
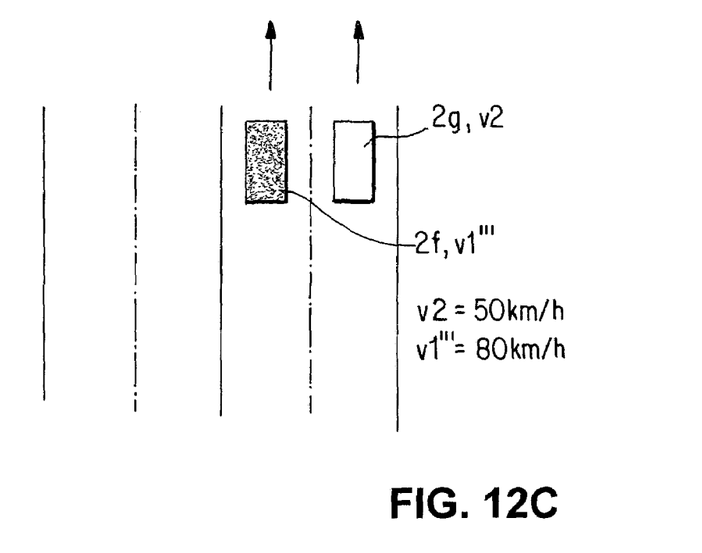

FIGS. 12A to 12C show, as an example, an acceleration phase of the vehicle 2f driving behind, in which it accelerates in $3^{rd}$ gear from a speed v1=50 km/h to a speed of v1'''=80 km/h. In this case, the vehicle 2f changes to the left-hand lane when falling below the remaining distance x of 20 m at a speed of v1=60 km/h (FIG. 12A). When it reaches a speed of v1''=70 km/h, the vehicle 2f shifts into $4^{th}$ gear (see FIG. 12B) before finally driving past the vehicle 2g in front at a speed of v1'''=80 km/h, see FIG. 12C.

The following changes in the dynamic noise pattern of the accelerating vehicle 2f are in this case recorded in the vehicle 2g driving in front:

During the acceleration from v1=50 km/h to v1'=60 km/h by the vehicle 2f, the sonic pressure level SP increases due to higher engine load, higher rpm and decreasing distance. This increase is determined by the acoustic radar 7g of the vehicle 2g for the vehicle 2f based on the ignition frequency and its harmonics. The tire noise, which changes due to higher load, increasing speed and decreasing distance, is likewise determined based on the variation of the typical tonal and noise-related components. To this end, the recorded acoustic signals Sf of the vehicle 2f are analyzed using the evaluation unit 10g of the vehicle 2g using stored noise patterns, and are checked for whether they fall within limit values. In this case, by evaluating the amplitude (and consequently the sonic pressure level SP) and comparing it with noise patterns, the recorded noise signals Sf of airborne and/or structure-borne noise are allocated to a noise source type (for example an operating state of the relevant object—here the driving vehicle 2f) and/or classified. Depending on the type and structure of the acoustic radar 7g, the movement of the vehicle 2f (and therefore of the noise source), is determined based on a plurality of distributed sound sensors 8 (i.e., the microphones M1 to M16). The noise signal Sf attributable to the vehicle 2f is corrected based on the recorded movement of the vehicle 2f. Such a correction of noise signal Sf, taking the movement into account, makes it possible to identify the noise source type, for example a road or rail vehicle. To this end, the acoustic analysis of the noise signal Sf is combined with a speed analysis.

For example, the lane change at v1'=60 km/h according to FIG. 12A is detected based on the changing level distribution in the differently oriented directional microphones M1 to M4. The gear shift of the accelerating vehicle 2f is determined by analysis of significant level and frequency discontinuities in the ignition frequency, typical harmonics and/or with the aid of a spectral pattern change in the tire noise, which is typical of a load change.

The start of the actual overtaking procedure is recorded based on the changing distribution level in the directional microphones M1, M2, M5 and M6. In this case, the recorded sonic pressure levels SP of the directional microphones M1, M2, M5 and M6 are processed using previous sonic pressure levels SP, stored and/or calculated data and/or data of other systems, for example a video camera, and are extrapolated. Based on these, it is then possible to project expected vehicle positions. Besides linear extrapolations, higher polynomials may also be approximated.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining information regarding a stationary or moving object, comprising:
   recording acoustic signals emitted by a first object or reflected by a second object, as a reference signal;
   using the recorded reference signal to detect, evaluate or identify the first or second object; and
   calculating or projecting a movement state or movement profile pertaining to the first or second object, based on the recorded acoustic signals;
   wherein said acoustic signals comprise operational noise that is generated by at least one of said first and second objects, as an intrinsic result of operation thereof.

2. The method as claimed in claim 1, in which one of structure-borne and air-borne sound signals are recorded as the acoustic signals.

3. The method as claimed in claim 1, wherein the acoustic signals are processed in real time or transmitted to other systems.

4. The method as claimed in claim 1, wherein noise signals representing the first or second object are filtered out of the recorded acoustic signals.

5. The method as claimed in claim 1, wherein the movement profile of the first or second object is calculated and optimized with respect to at least one coordinate axis based on a noise analysis.

6. The method as claimed in claim 5, wherein the movement profile of the first or second object is monitored for a possible collision based on the noise analysis.

7. The method as claimed in claim 6, wherein one of information and a control signal is delivered to a communication, control or regulating system when a collision risk is identified.

8. The method as claimed in claim 1, wherein information from one of a geographical information system and a previous noise analysis, is taken into account during the detection, evaluation or identification of the first or second object.

9. The method as claimed in claim 1, wherein an associated priority is specified for an operator of the first or second object.

10. The method as claimed in claim 1, wherein an associated priority is specified for a safety-relevant operation of the first or second object.

11. The method as claimed in claim 1, wherein an operation with a higher priority is given precedence over an operation with a lower priority.

12. The method as claimed in claim 1, wherein one of acoustic signals, noise signals and other operational signals from neighboring objects or systems are recorded, received or taken into account during a relevant analysis.

13. The method as claimed in claim 1, wherein one of the recorded acoustic signals and noise signals are processed based on at least one analysis, by assigning signal patterns using at least one of neural networks or fuzzy logic.

14. A passive acoustic radar system for determining information regarding a stationary or moving object, comprising:
   at least one sonic transducer system having a directional characteristic for recording acoustic signals emitted by a first object or reflected by a second object; and
   an evaluation unit for detecting, evaluating or identifying the first or second object based on recorded acoustic signals; wherein,
   the sonic transducer system comprises a plurality of sound sensors for multidirectional recording of acoustic signals or object-related noise signals for direction-related self-localization; and
   said acoustic signals comprise operational noise that is generated by at least one of said first and second objects, as an intrinsic result of operation thereof.

15. The device as claimed in claim 14, wherein the sonic transducer system comprises at least one microphone with a spherical or directional characteristic, as the sound sensor.

16. The device as claimed in claim 14, wherein at least one of the object-related transducer and transducers arranged in an environment are monitored by a control center.

17. The device as claimed in claim 14, for use in a driver assistance system.

18. The device as claimed in claim 14, for use in an integrated traffic monitoring system.

19. A method for detecting and evaluating an object which is situated in proximity to a vehicle, said method comprising:
   recording and storing as reference signals, first sound signals emanating from the vehicle;
   recording second sound signals including sounds emanating from or reflected by said object; and
   using said recorded reference signals and said recorded second sound signals to detect, evaluate or identify said object, including calculating or projecting a movement state or movement profile for the object, based on said signals;
   wherein said sound signals comprise operational noise that is generated by at least one of said vehicle and said object, as an intrinsic result of operation thereof.

20. The method according to claim 19, wherein said operational noise comprises at least one of engine noise, transmission noise and tire noise.

21. The method according to claim 1, wherein:
   at least one of said first and second objects is a vehicle; and
   said operational noise comprises at least one of engine noise, transmission noise, and tire noise of said vehicle.

22. The method according to claim 14, wherein:
   at least one of said first and second objects is a vehicle; and
   said operational noise comprises at least one of engine noise, transmission noise, and tire noise of said vehicle.

* * * * *